(12) United States Patent
Connell

(10) Patent No.: US 10,036,440 B2
(45) Date of Patent: Jul. 31, 2018

(54) ORIENTATION INDEPENDENT NON-PRESSURE HEAD FOR A RAILWAY BRAKE CYLINDER

(71) Applicant: New York Air Brake, LLC, Watertown, NY (US)

(72) Inventor: Jason Connell, Bethel Park, PA (US)

(73) Assignee: New York Air Brake, LLC, Watertown ( * ) Notice: Subject to any disclaimer, the term of this patent is extended or adjusted under 35 U.S.C. 154(b) by 0 days.

(21) Appl. No.: 15/194,710

(22) Filed: Jun. 28, 2016

(65) Prior Publication Data

US 2017/0370432 A1    Dec. 28, 2017

(51) Int. Cl.
  *F16D 65/16*    (2006.01)
  *B61H 13/34*    (2006.01)
  (Continued)

(52) U.S. Cl.
  CPC ............. *F16D 65/16* (2013.01); *B61H 13/34* (2013.01); *F16D 2121/08* (2013.01); *F16D 2125/04* (2013.01); *F16D 2250/0084* (2013.01)

(58) Field of Classification Search
  CPC ...... B60T 13/261; B60T 13/266; B60T 13/38; B60T 17/08; B60T 17/083; B60T 17/085;
  (Continued)

(56) References Cited

U.S. PATENT DOCUMENTS 3,508,470 A * 4/1970 Wearden ............... B60T 17/086
  92/128
3,548,720 A * 12/1970 Wearden ............... B60T 17/086
  92/130 A (Continued)

FOREIGN PATENT DOCUMENTS

GB    944223 A    12/1963
GB    1390531 A *    4/1975    ............ B60T 17/083
(Continued)

OTHER PUBLICATIONS

International Search Report and Written Opinion Form PCT/ISA/220, International Application No. PCT/US2016/039731, pp. 1-13, International Filing Date Jun. 28, 2016, search report dated Apr. 18, 2017.

*Primary Examiner* — Thomas J Williams
(74) *Attorney, Agent, or Firm* — Bond Schoeneck & King, PLLC; David Nocilly

(57) ABSTRACT

A brake cylinder with a cylinder body having a first flange extending radially therefrom to form a radial edge with a bevel and a non-pressure head having a second flange extending radially therefrom, wherein the second flange is spaced apart from the first flange to define a first gap and includes an angled portion that extends over the bevel of the first flange to define a second gap in communication with the first gap. The two flanges form a gap in communication with the interior of the brake cylinder that extends outwardly to a V-shaped gap between the bevel of the first flange and the angled portion of the second flange to define a brake cylinder vent. The vent may be limited to four predetermined locations spaced equidistantly about the brake cylinder or the vent may extend circumferentially about the brake cylinder.

7 Claims, 11 Drawing Sheets

(51) Int. Cl.
*F16D 121/08* (2012.01)
*F16D 125/04* (2012.01)

(58) Field of Classification Search
CPC .. F16D 2121/08; F16D 2125/04; F16D 65/16;
F16D 2250/0084; B61H 13/34
USPC .............................. 303/9.76; 188/170; 92/63
See application file for complete search history.

(56) References Cited

U.S. PATENT DOCUMENTS

| | | | | |
|---|---|---|---|---|
| 3,613,515 | A * | 10/1971 | Swander, Jr. ......... | B60T 17/086 |
| | | | | 188/170 |
| 3,613,938 | A * | 10/1971 | Westcott ............ | B65D 21/0233 |
| | | | | 220/366.1 |
| 3,943,831 | A | 3/1976 | Coupland | |
| 4,017,125 | A * | 4/1977 | Durling ................ | B60T 13/261 |
| | | | | 303/7 |
| D526,332 | S | 8/2006 | McCurdy, Jr. | |
| 7,303,053 | B2 | 12/2007 | McCurdy, Jr. | |
| 2006/0060433 | A1 | 3/2006 | McCurdy, Jr. | |
| 2010/0116601 | A1 * | 5/2010 | Andrews ............... | B60T 17/004 |
| | | | | 188/153 R |
| 2016/0214630 | A1 * | 7/2016 | Wright ................... | B61H 13/34 |

FOREIGN PATENT DOCUMENTS

GB     1450227 A    9/1976
WO   2010033490 A2  3/2010

\* cited by examiner

ORIENTATION INDEPENDENT NON-PRESSURE HEAD FOR A RAILWAY BRAKE CYLINDER

BACKGROUND OF THE INVENTION

1. Field of the Invention

The present invention relates to railway brake cylinders and, more specifically, to a non-pressure head for a brake cylinder that can be positioned in multiple orientations.

2. Description of the Related Art

Railway brake cylinders generally include a brake cylinder body and a movable piston within the body that drives a hollow rod interconnected to the brakes of the railway car. One side of the piston is pressurized to move the piston and apply the braking force, and a return spring moves the piston to the brakes releases piston when the pressure is removed. The non-pressurized side of brake cylinder is vented through a non-pressure head that is mounted to the brake cylinder body. A conventional non-pressure head helps guide the hollow rod used to transmit the forces generated by the pressurization of the piston to the braking assembly, provides environmental protection, and allows for venting of the non-pressurized side of the piston as the brakes are applied and the piston moves through the cylinder body and for a return flow of air when the brakes are released and the piston returns in response to exhausting of the pressurization under the force of the return spring. The non-pressure head also provides a way for any accumulated water to drain out of the non-pressure side of the brake cylinder if any water accumulates through condensation or ingress from the outside. A conventional non-pressure head, such as that seen in U.S. Pat. No. 7,303,053, includes a vent that provides for atmospheric venting and, when properly positioned in a downward orientation, will drain any moisture that has accumulated inside the non-pressurized side of the brake cylinder.

A brake cylinder body typically includes a mounting flange having mounting feet positioned on one side of the cylinder body to securely attach the brake cylinder to a railway car. Depending on the style of railway car and braking assembly, the brake cylinder may be mounted with the mounting flange facing down, up, right or left. As there are four possible orientations for mounting of the brake cylinder to the railway car, four different model brake cylinders must be made manufactured and kept on hand to ensure that the vent of the non-pressure head will end up positioned downwardly when the brake cylinder is installed on the railway car. In addition to increasing the amount of inventory of brake cylinders that must be on hand, the need for four different style brake cylinders necessarily increases the probability that a brake cylinder with the wrong vent orientation will be installed on a given railway car, thereby allowing for water ingress into the brake cylinder and corrosion from the trapped water that compromises the effectiveness and lifespan of the brake cylinder. Accordingly, there is a need in the art for a brake cylinder that will properly drain regardless of which orientation is used for installation of that brake cylinder in a railway car.

BRIEF SUMMARY OF THE INVENTION

The present invention is a brake cylinder with a cylinder body having a first flange extending radially therefrom to form a radial edge with a bevel and a non-pressure head having a second flange extending radially therefrom, wherein the second flange is spaced apart from the first flange to define a first gap and includes an angled portion that extends over the bevel of the first flange to define a second gap. The bevel of the first flange and the angled portion of the second flange are configured so that the second gap expands as it extends from the first gap and forms a V-shaped gap. The first gap and the second gap may be formed by first flange and second flange in four predetermined locations spaced equidistantly about the brake cylinder. Alternatively, the first gap and the second gap may extend circumferentially about the brake cylinder. In this option, the second flange may include a series of standoffs spaced circumferentially about second flange to space the first flange apart from second flange. The standoffs can be integrally formed into the second flange, or separate structures that are attached to the second flange.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
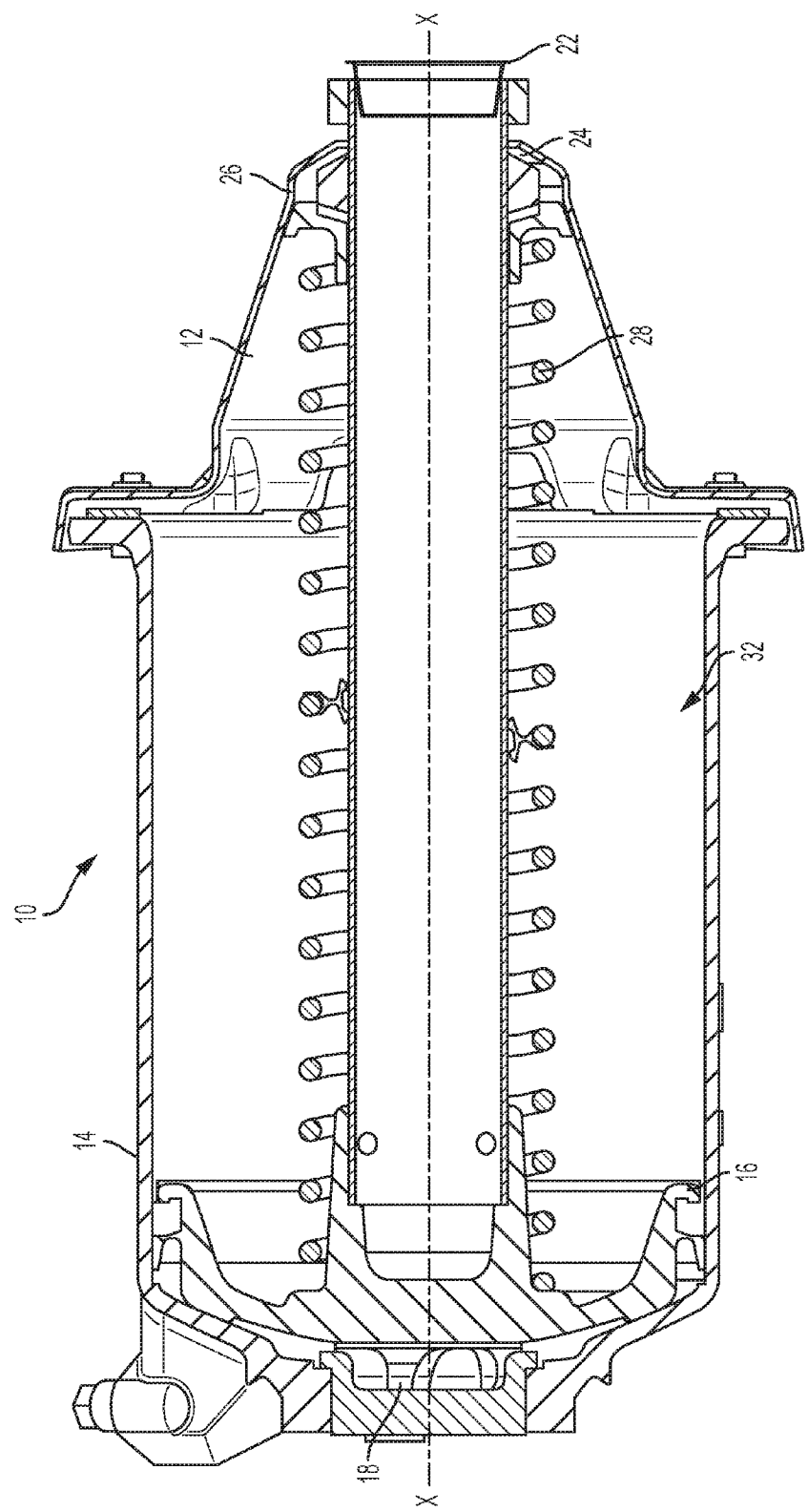
FIG. 1 is a cross-sectional view of a brake cylinder according to the present invention.

Referring to the drawings, wherein like numerals refer to like parts throughout, there is seen in FIG. 1 a brake cylinder 10 having a non-pressure head 12 attached to a cylinder body 14 according to the present invention. Cylinder body 14 is extending cylindrically about a longitudinal axis X-X and houses a piston 16 that is moveable movable within cylinder body 14 from a brakes released position to a brakes applied position in response to the introduction of pressurized air from a brake cylinder pressure source into a chamber 18 on one side of piston 16. A hollow rod 22 is coupled to the other side of piston 16 to extend and retract through a guide portion 24 positioned in the free end 26 of non-pressure head 12 as piston 16 moves between the brakes releases and brakes applied positions. As in known in the art, hollow rod 22 is also interconnected to the brakes of a railway car so that the movement of piston 16 will apply or release the brakes. A brake piston return spring 28 is positioned in brake cylinder 10 to bias piston 16 into the brakes released position in the absence of sufficient brake cylinder pressure in chamber 18.

Figure 2:
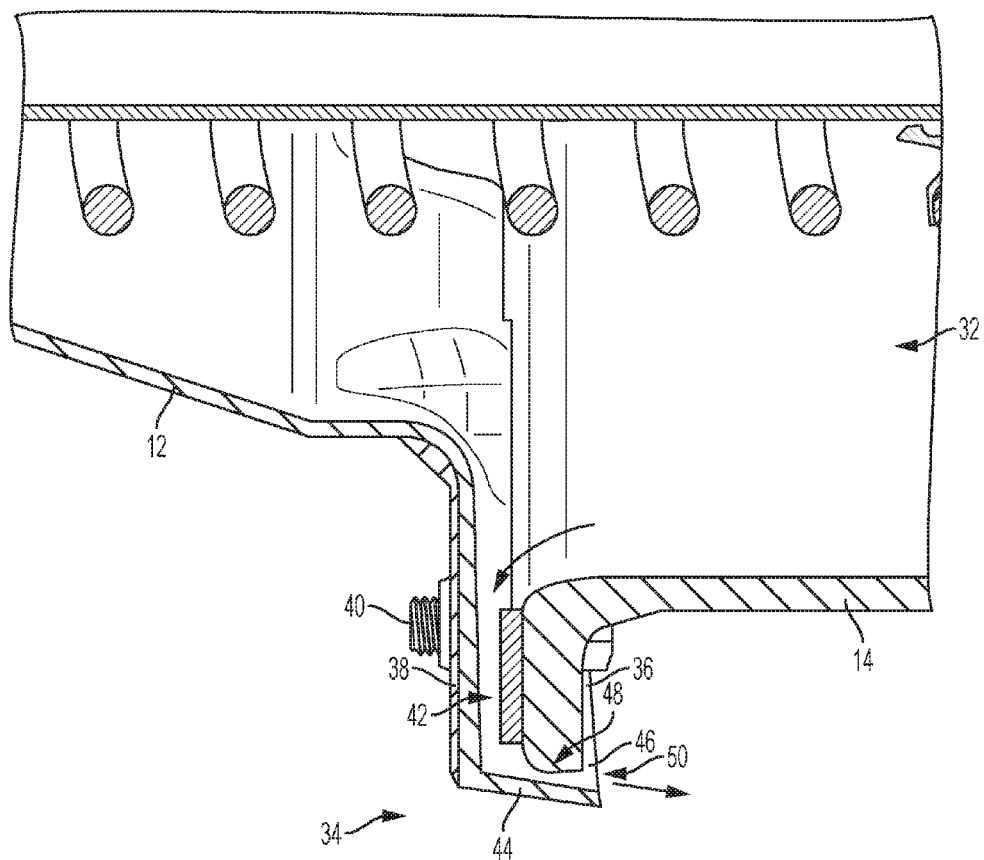
FIG. 2 is a partial cross-sectional view of the interface between the non-pressure head and cylinder body of a brake cylinder according to the present invention.
Figure 3:
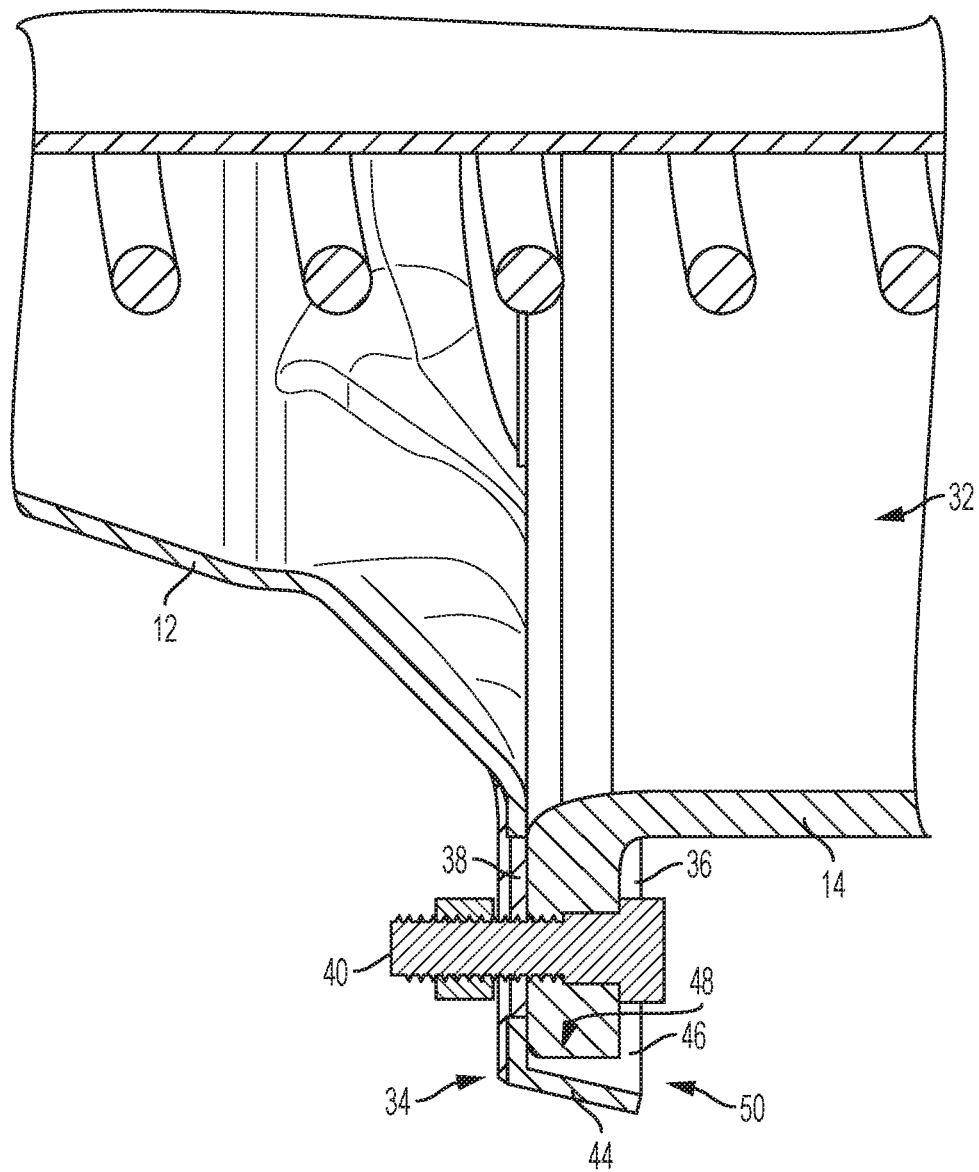
FIG. 3 is another partial cross-sectional view of the interface between the non-pressure head and cylinder body of a brake cylinder according to the present invention.
Figure 4:
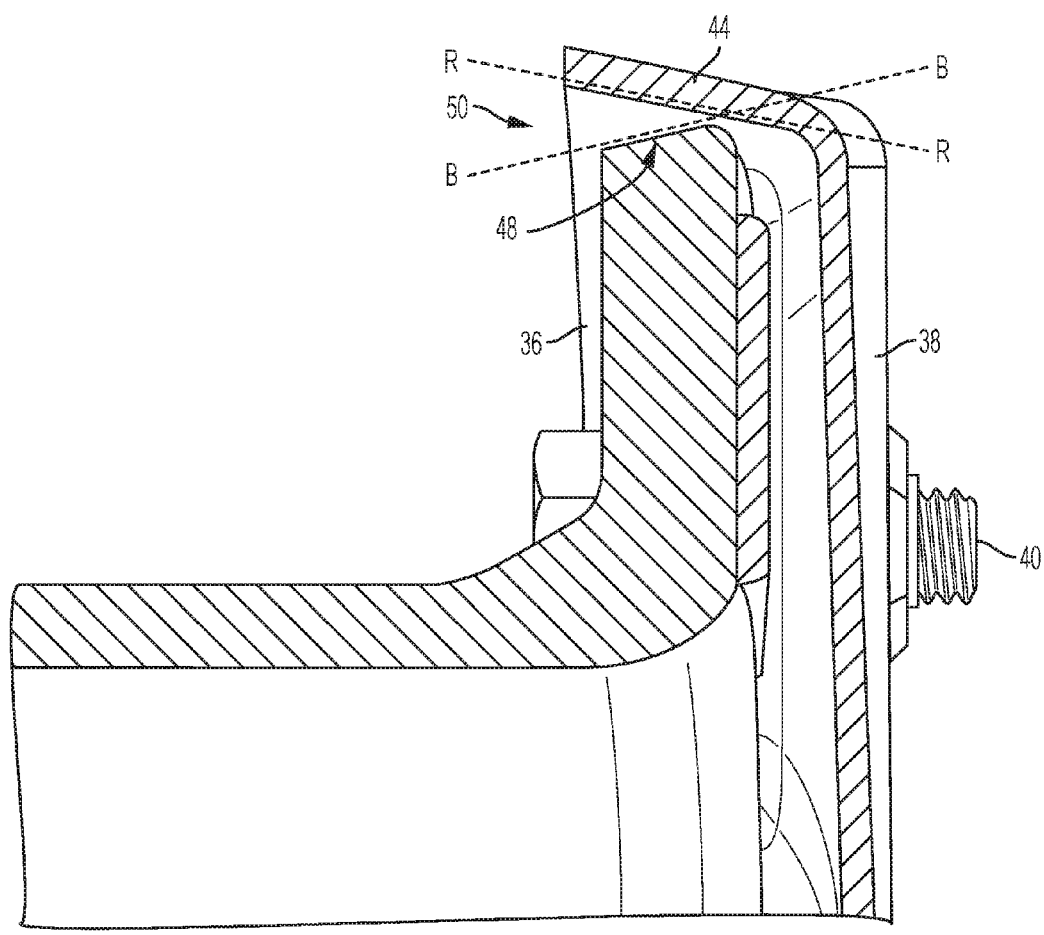
FIG. 4 is a partial cross-sectional view of the profile of the flanges of the non-pressure head and cylinder body of a brake cylinder according to the present invention.
Figure 5:
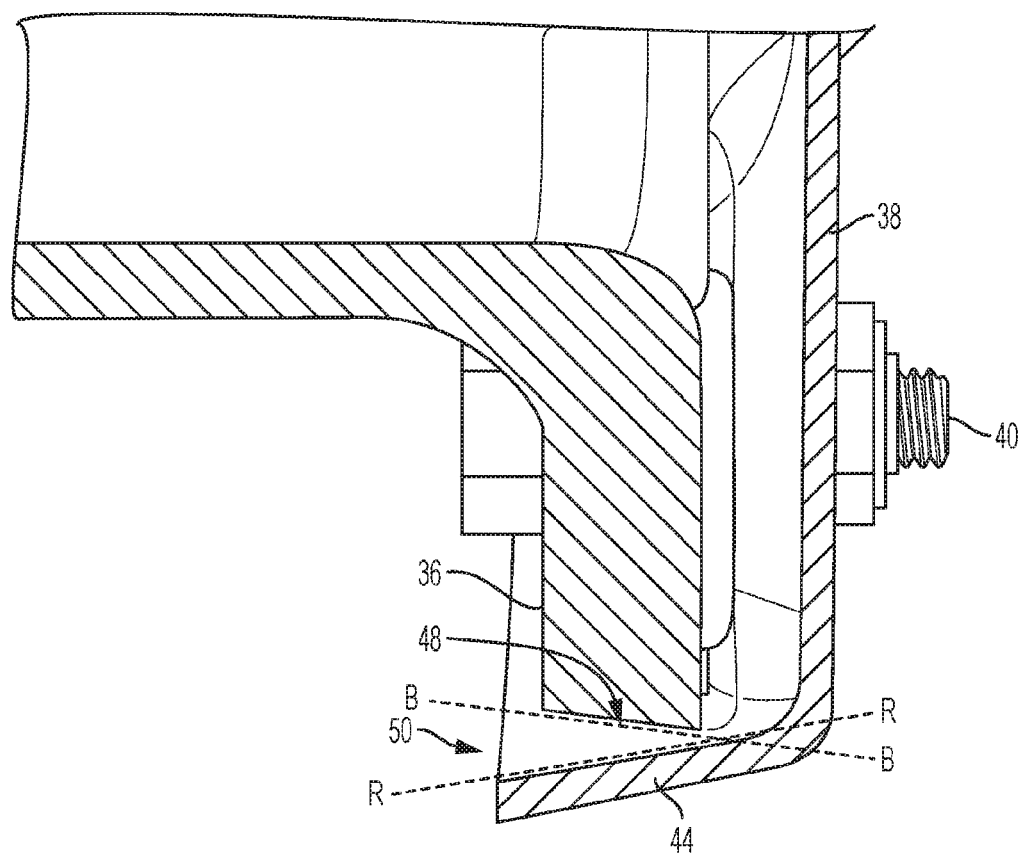
FIG. 5 is another partial cross-sectional view of the profile of the flanges of the non-pressure head and cylinder body of a brake cylinder according to the present invention.

Referring to FIGS. 2 and 3, venting of the inside 32 of the non-pressure side of brake cylinder 10 is accomplished by a vent 34 formed at the junction of non-pressure head 12 and cylinder body 14. More specifically, vent 34 is formed by a first flange 36 that extends radially from cylinder body 14 and a second flange 38 that extends radially from non-pressure head 12. First flange 36 and second flange 38 are spaced apart when secured together, such as via a bolt 40, to define a radially extending gap 42 that is in communication with the inside 32 of brake cylinder 10. Referring to FIGS. 4 and 5, second flange 38 includes a roof flange 44 comprising an additional portion extending from second flange 38 along axis R-R that is non-parallel to longitudinal axis X-X and approaches axis X-X toward body cylinder 14 so that roof flange 44 extends over and partially covers first flange 36. First flange 36 further includes a radial edge 46 having a bevel 48 that extends along axis B-B that non-parallel to axis X-X and approaches axis X-X toward non-pressure head 12 to define a V-shaped gap 50 between radial edge 46 of bevel 48 and angled roof flange 44 of second flange 38 with the wider portion of V-shaped gap 50 opened toward body cylinder 14. V-shaped gap 50 is in communication with gap 42 to provide open communication between the inside 32 of brake cylinder 10 and outside atmosphere, thereby allowing air to ingress and egress when piston 16 translates along the inside of cylinder body 14. Vent 34 is interrupted at locations wherever any bolts 40 are passed through first flange 36 and second flange 38 to secure non-pressure head 12 to cylinder body 14. It should be recognized that while it is more practical to form roof flange 44 in non-pressure head 12 and bevel 48 in body cylinder 10 due to the fact that body cylinder 14 is built to withstand the pressure used to move piston 16, the structure forming vent 32 could be reversed to accomplish the same result. An angle between about 5° to 60° may be used for each of roof flange 14 and bevel 48, with angles of 15° to 30° preferred.

Referring to FIG. 4, vent 34 formed by angled roof flange 44 of second flange 38 and bevel 48 of first flange 36 will allow for the ingress and egress of air along the top of brake cylinder 10 when brake cylinder 10 is installed. At the same time, bevel 48 will discourage the ingress of water as bevel 48 is angled so that moisture will drain away from V-shaped gap 50 and roof flange 44 will deflect any rain or dripping from above brake cylinder 10. Correspondingly, as seen in FIG. 5, V-shaped gap 50 will also promote draining of liquids from inside brake cylinder 10 as roof flange 44 is angled downwardly so that any liquids accumulating in brake cylinder 10 will flow downward through radial gap 42 and into V-shaped gap 50. As a result, vents 32 formed by first flange 36 and second flange 38 will allow for venting and drainage of brake cylinder 10 regardless of how brake cylinder 10 is mounted to a railway car. In other words, brake cylinder 10 will properly vent and drain in any mounting orientation relative to railway car. V-shaped gap 50 may be fitted with a screen, open cell foam, or other conventional protective measures for the exclusion of contaminants such as dirt and insects.

Figure 6:
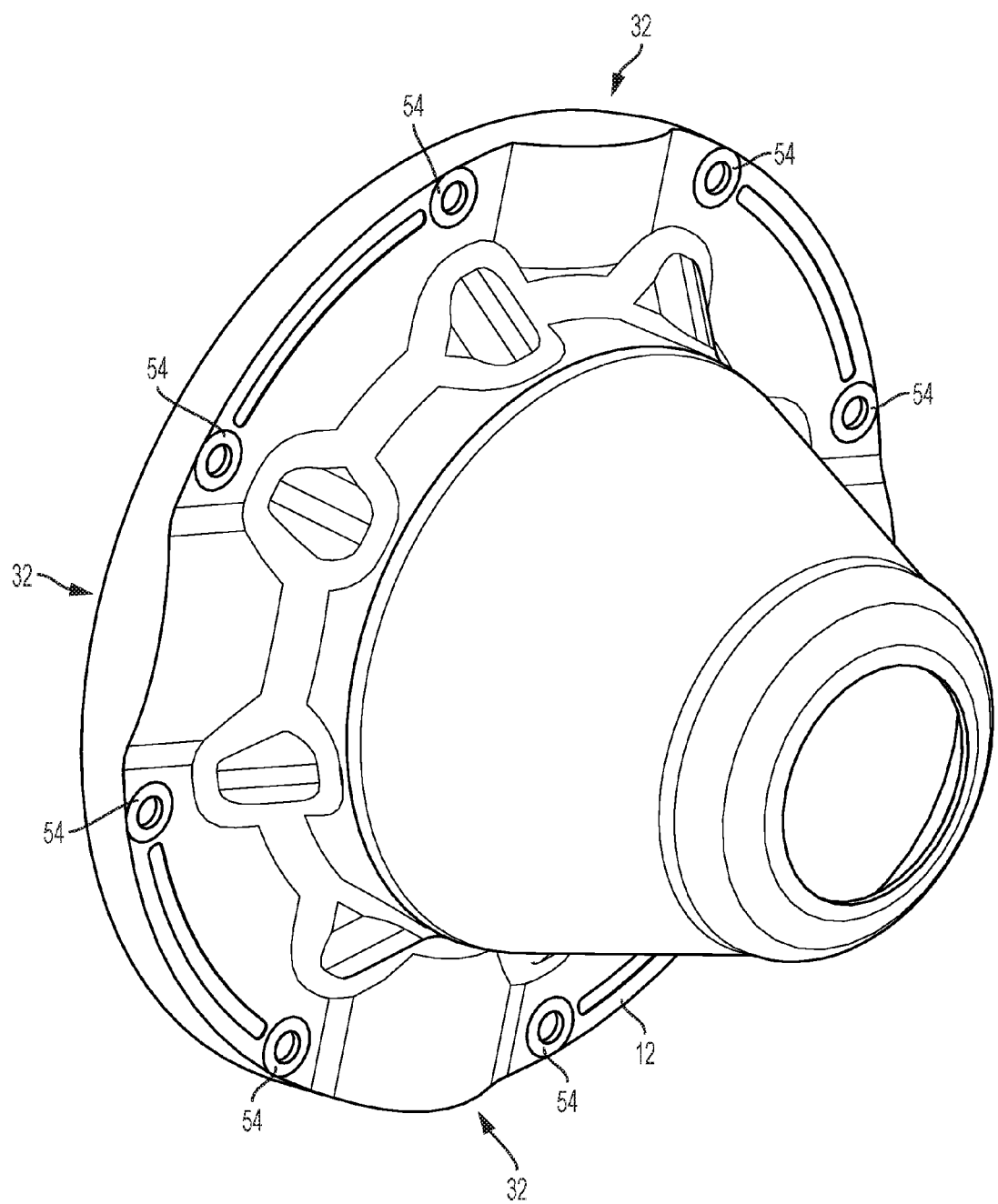
FIG. 6 is a perspective view of one embodiment of a non-pressure head for a brake cylinder according to the present invention.
Figure 7:
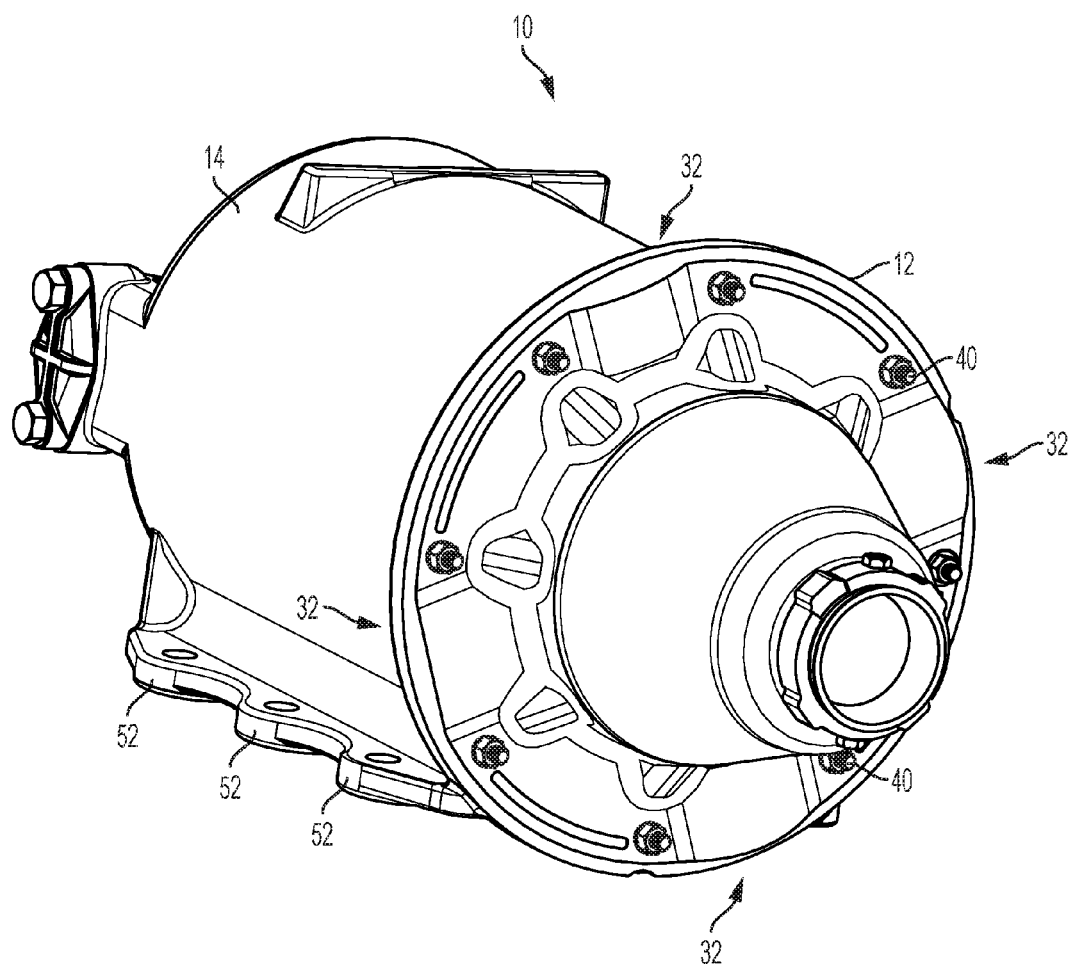
FIG. 7 is a perspective view of a brake cylinder having the non-pressure head of FIG. 6.

Referring to FIG. 6, non-pressure head 12 may be configured to include four vents 32 formed by the corresponding first flange 36 of cylinder body 14 and second flange 38 of non-pressure head, respectively. Vents 32 are positioned in the four specific locations that correspond to the currently used brake cylinder mounting orientations relative to the mounting feet 52 of brake cylinder 10, i.e., at 0 degrees, 90 degrees, 180 degrees, and 270 degrees. Thus, regardless of which of the four mounting orientations are used for a particular installation, there will always be one of the four vents 32 facing downwardly to provide for drainage in event that any moisture does get inside brake cylinder 10 and the remaining three vents 32 positioned to either side and in the uppermost position. In this embodiment, the portions of non-pressure head 12 between each of the four vents 32 omit radial gap 42 and are used to support bolts 40 holding non-pressure head 12 onto cylinder body 14, as seen in FIG. 7. In these intermediate portions between vents 32, first flange 36 and second flange 38 are positioned in engagement with each other without forming radial gap 42, either by close engagement or by providing a gasket between first flange 36 and second flange 38. Holes 54 may be provided between vents 32 for accepting bolts 40 that secure non-pressure head 12 to cylinder body 14.

Figure 8:
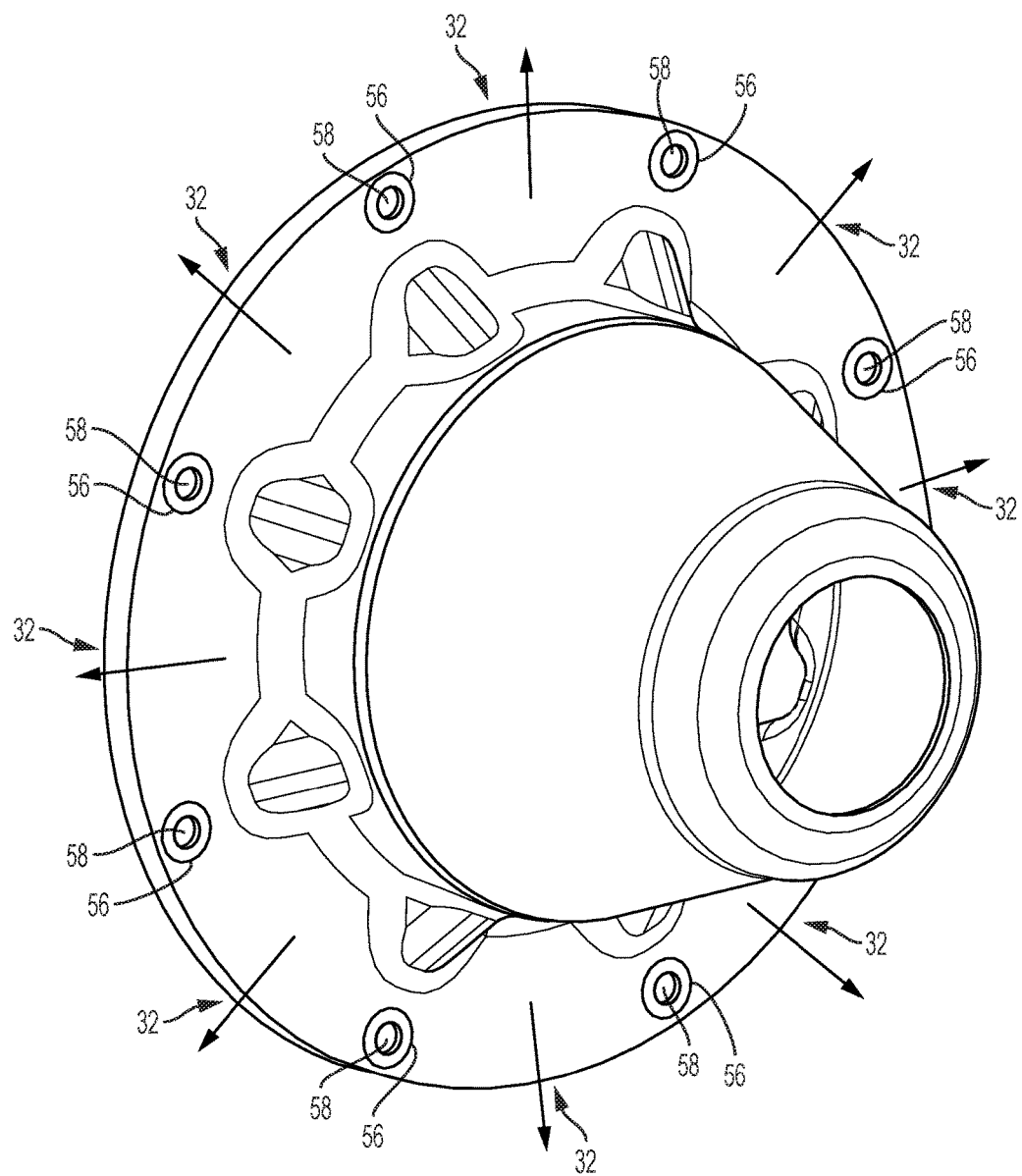
FIG. 8 is a perspective view of another embodiment of a non-pressure head for a brake cylinder according to the present invention.
Figure 9:
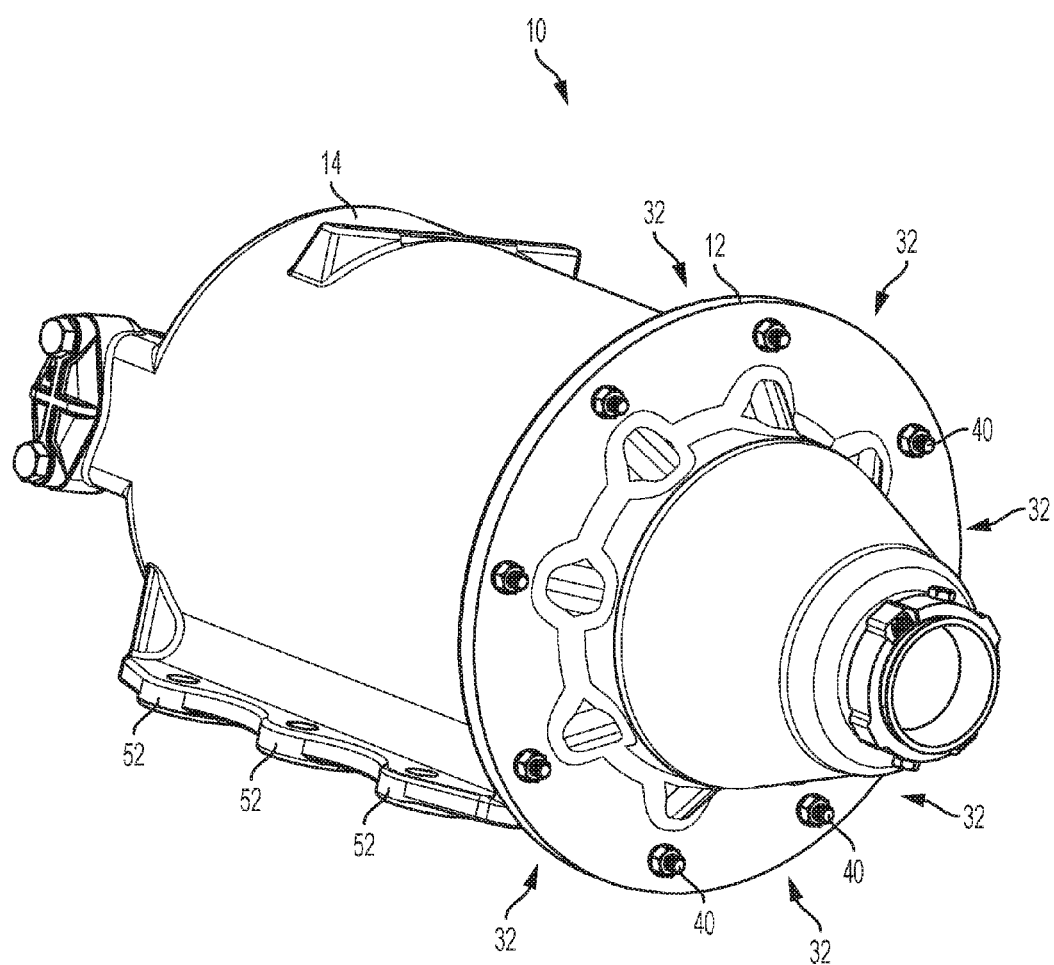
FIG. 9 is a perspective view of a brake cylinder having the non-pressure head of FIG. 8.
Figure 10:
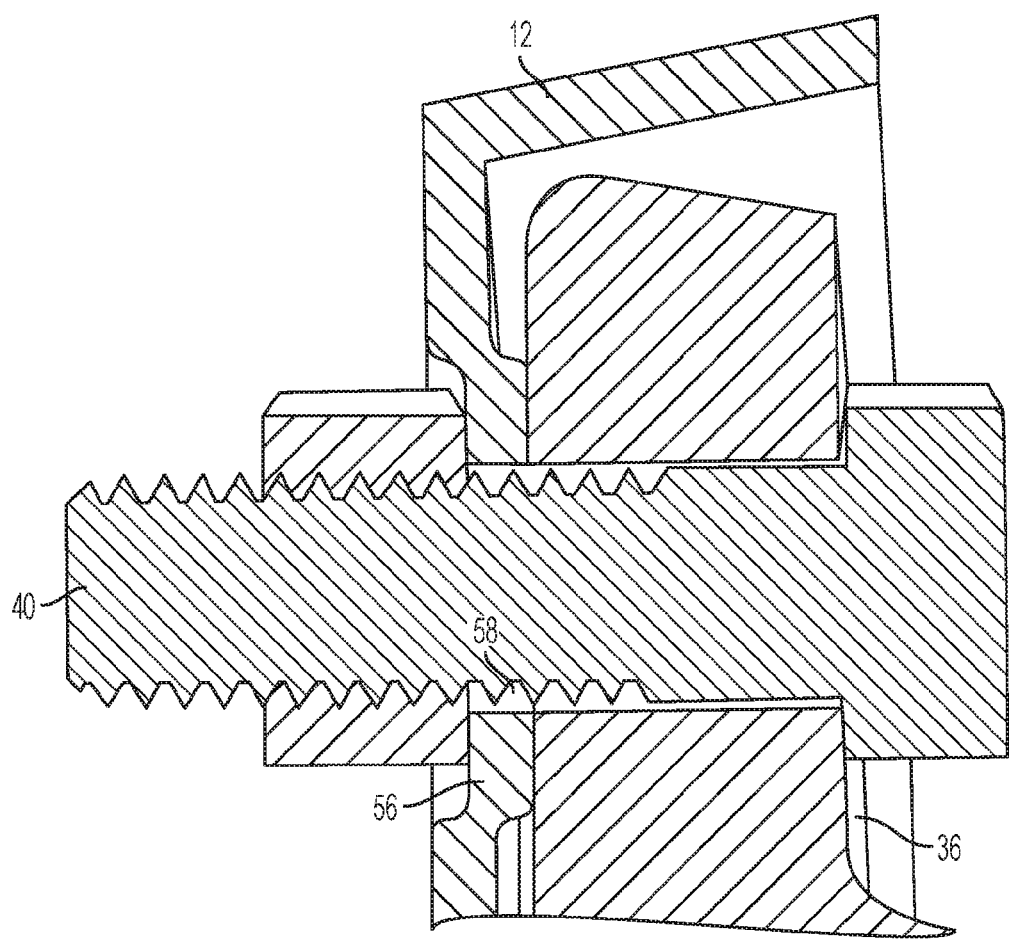
FIG. 10 is a partial cross-sectional view of the profile of another embodiment of flanges of a non-pressure head and a cylinder body of a brake cylinder according to the present invention.
Figure 11:
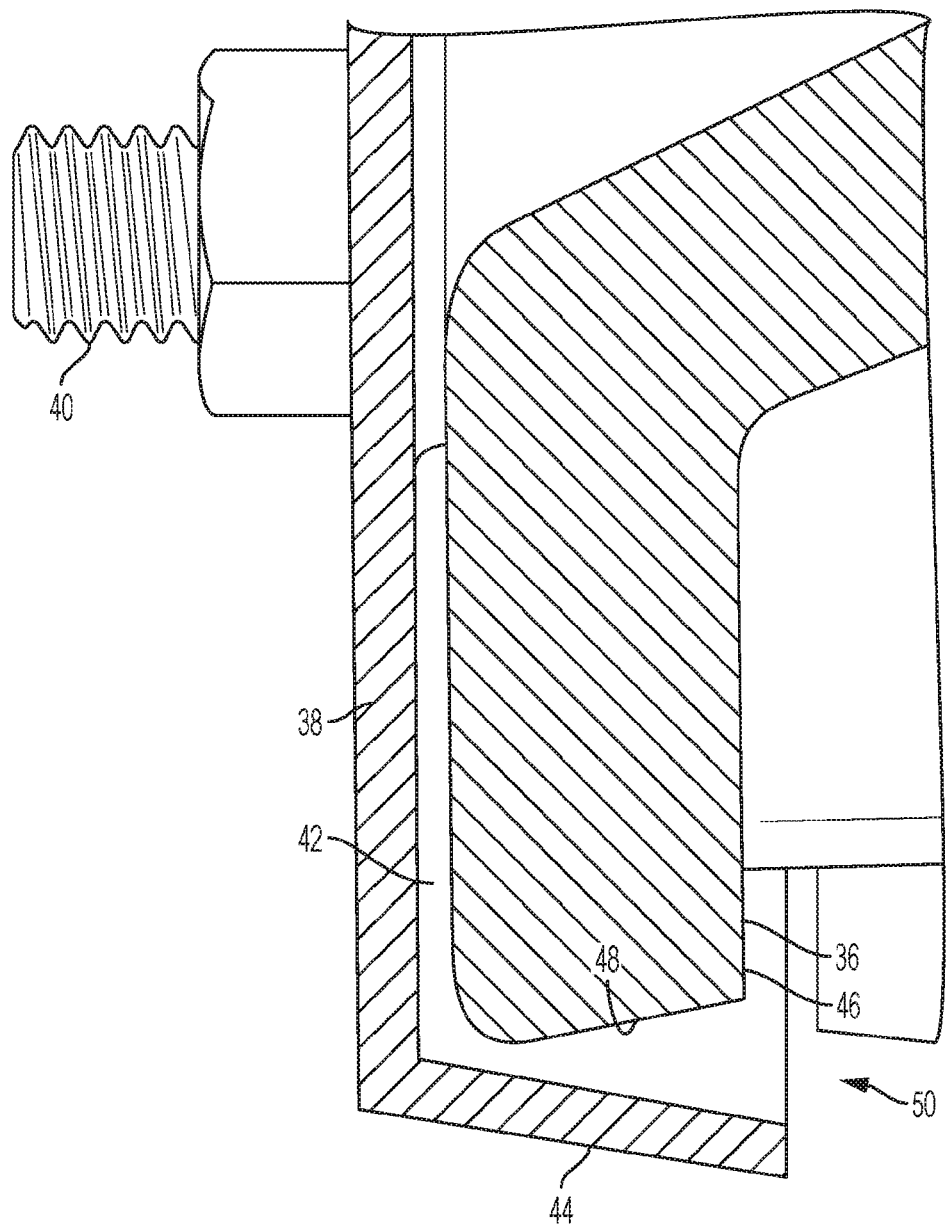
FIG. 11 is a second partial cross-sectional view of the profile of another embodiment of the flanges of a non-pressure head and a cylinder body of a brake cylinder according to the present invention.

Referring to FIG. 8, vent 34 may be configured to extend completely around the intersection of non-pressure head 12 onto cylinder body 14. In this embodiment, non-pressure head 12 may include a plurality of standoffs 56 positioned circumferentially about second flange 38. Standoffs 56 space second flange 38 apart from first flange 36 to define radial gap 42. Standoffs 56 can include a hole 58 formed therethrough, thereby acting as washers or spacers, to accept bolts 40 used to secure non-pressure head 12 to cylinder body 14 while spacing non-pressure head 12 and cylinder body 14 apart to form radial gap 42 of vent 34. Standoffs 56 may be integrally formed by being stamped or cast into second flange 38 of non-pressure head 12, or provided as separate structures (such as washers), as long as the resulting space between first flange 36 and second flange 38 is sufficient to form radial gap 42. The use of a vent 34 that extends around the circumference of brake cylinder 10 also avoids the need for a gasket positioned between non-pressure head 12 and cylinder body 14, thereby improving the bolting interface and reducing costs. As nearly the entire junction of first flange 36 and second flange 38 provides vent 34, brake cylinder 10 will adequately drain in numerous orientations (not just the four orientations used to attached brake cylinder 10 to a railway car) as some portion of the nearly continuously circumferentially extending vent 34 will always be positioned downwardly regardless of how brake cylinder 10 is mounted to a railway car.

Vent 34 should have a cross-sectional area of at least 1.75 square inches. For example, in a brake cylinder 10 having a diameter of 10 inches, a radial gap 42 of 0.055 inches would provide a sufficient cross-sectional area. To prevent plugging, it may be advisable to provide a radial gap 42 of at least 0.062 inches (1/16 inches) on a 10 inch size brake cylinder 10, with a maximum of about 0.09375 inches (3/32 inches) if a filter or screen is not used. If a filter or screen is used, radial gap 42 could be increased. The cross-sectional area of vent 34 should extend to a similar cross-sectional area for the beginning of V-shaped gap 50 and then widen as roof flange 14 and bevel 48 angle outwardly from each other.

What is claimed is:

1. A brake cylinder, comprising:
   a cylinder body having a first flange extending radially therefrom and having a radial edge with a bevel;
   a non-pressure head having a second flange extending radially therefrom, wherein the second flange is spaced apart from the first flange to define a first gap and includes a roof flange extending from the second flange over the bevel of the first flange to define a second gap that is V-shaped and is in communication with the first gap, and wherein the second flange is angled and cooperates with the bevel of the first flange so that the second gap expands as it extends away from the first gap; and
   wherein the first gap and the second gap extend circumferentially about the brake cylinder.

2. The brake cylinder of claim 1, wherein the second flange includes a series of standoffs spaced circumferentially about the second flange to space the first flange apart from the second flange.

3. The brake cylinder of claim 2, wherein the standoffs are integrally formed into the second flange.

4. The brake cylinder of claim 2, wherein the standoffs are separate and positioned between the first flange and the second flange.

5. A method of making a brake cylinder, comprising:
   providing a cylinder body having a first flange extending radially therefrom and having a radial edge with a bevel;
   providing a non-pressure head having a second flange extending radially therefrom, wherein the second flange includes a roof flange extending from the second flange;
   securing the cylinder body to the non-pressure head so that the first flange is spaced apart from the second flange to define a first gap and the roof flange extends over the bevel of the first flange to define a second gap that is V-shaped and is in communication with the first gap, wherein the second flange is angled and cooperates with the bevel of the first flange so that the second gap expands as it extends away from the first gap, and wherein the first gap and the second gap extend circumferentially about the brake cylinder.

6. The method of claim 5, wherein the second flange includes a series of standoffs spaced circumferentially about the second flange to space the first flange apart from the second flange.

7. The method of claim 6, wherein the standoffs are integrally formed into the second flange.

\* \* \* \* \*